Figure 1:
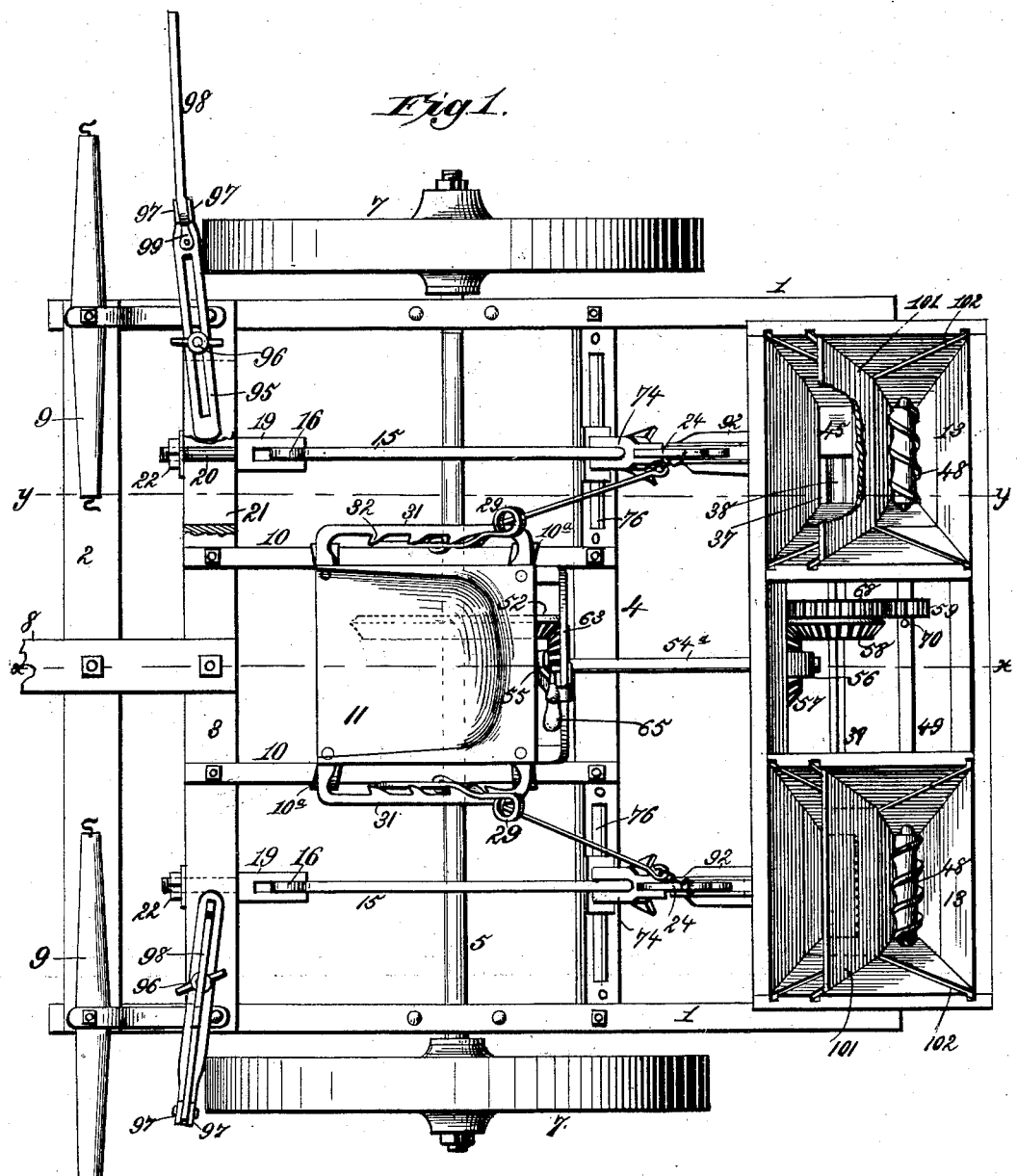

(No Model.) 3 Sheets—Sheet 1.

G. P. REID.
WHEEL CULTIVATOR AND SEEDER.

No. 371,097. Patented Oct. 4, 1887.

Witnesses.
Robt Emett
Geo. W. Rea.

Inventor:
George P. Reid.
By James L. Norris
Atty.

(No Model.) 3 Sheets—Sheet 2.

G. P. REID.
WHEEL CULTIVATOR AND SEEDER.

No. 371,097. Patented Oct. 4, 1887.

Witnesses.
Robert Emmett,
Geo. W. Rea.

Inventor.
George P. Reid.
By James L. Norris
Atty.

(No Model.) 3 Sheets—Sheet 3.
G. P. REID.
WHEEL CULTIVATOR AND SEEDER.
No. 371,097. Patented Oct. 4, 1887.
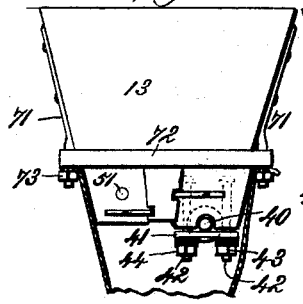
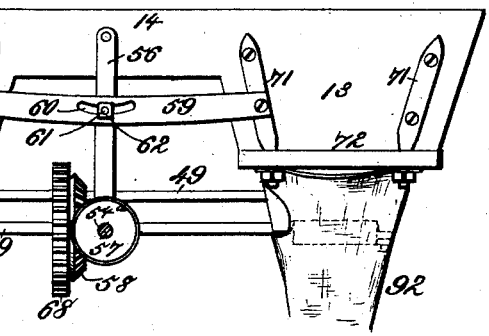
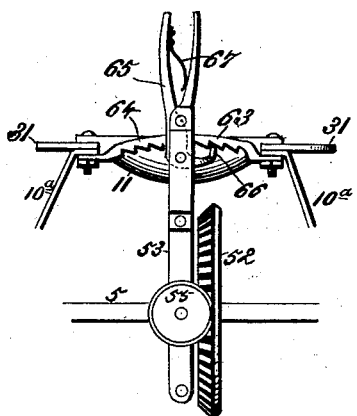
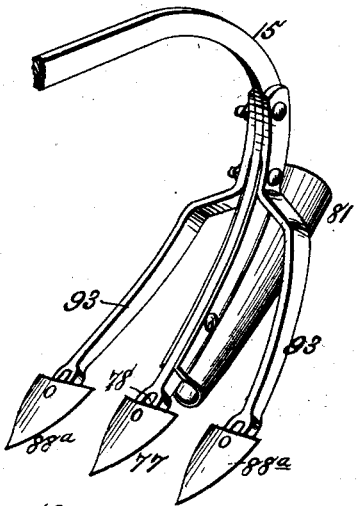
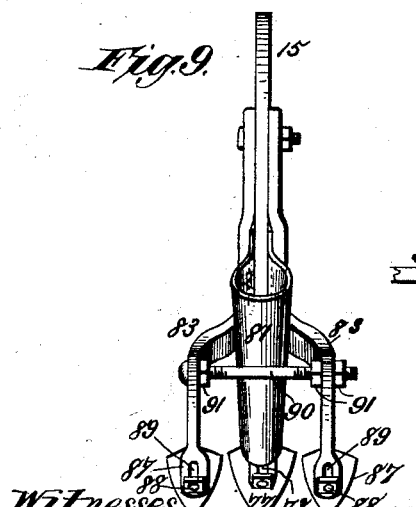
Witnesses.
Inventor:
George P. Reid.
By James L. Norris
Atty.

UNITED STATES PATENT OFFICE.

GEORGE P. REID, OF CUBA, NORTH CAROLINA.

WHEEL CULTIVATOR AND SEEDER.

SPECIFICATION forming part of Letters Patent No. 371,097, dated October 4, 1887.

Application filed July 12, 1887. Serial No. 244,099. (No model.)

*To all whom it may concern:*

Be it known that I, GEORGE P. REID, a citizen of the United States, residing at Cuba, in the county of Rutherford and State of North Carolina, have invented new and useful Improvements in Wheel-Cultivators, of which the following is a specification.

My invention relates to wheel-cultivators, and the purpose thereof is to combine with mechanism of this class interchangeable devices whereby the cultivator may be converted into a corn, cotton-seed, or pea planter, as circumstances may require.

It is a further purpose of my invention to provide means whereby fertilizing material may be distributed by the machine, in conjunction with the planting devices, and to combine therewith means for varying the quantity of fertilizer discharged, as well as regulating the distance between the successive depositions of seed.

It is a further purpose of my invention to provide a novel construction and combination of parts, whereby the distance or interval between two adjacent rows may be varied at will, to provide simple and novel mechanism for raising the plows and holding them, and to so construct the plows that they may be caused to work at a higher or lower point, as circumstances may require.

It is also my purpose to provide novel means whereby the seeding devices or the fertilizer-feeds, either or both, may be rendered inactive by the driver at any moment and for any period of time, to provide simple means for disconnecting the shaft operating the fertilizer - distributers, and to combine therewith and with the seeding devices spring slide-gages, by which the amount of seed or fertilizer which is dropped from the hoppers may be regulated.

It is my purpose, finally, to provide a construction whereby the plows, suitable either for the seeding mechanism or for the cultivator, may be caused to separate or to approach each other at will, and to combine with the frame of the machine a novel land-marker upon one or both sides thereof, whereby a guiding-mark is made in the soil at each traverse to guide the operator at the return, the construction being such that said land-marker is laterally extensible, or vice versa, its end being jointed or hinged to the main or body portion to permit it to be turned upward to avoid stones, stumps, or other obstructions.

The invention consists in the several novel features of construction and new combinations of parts, hereinafter fully set forth, and definitely pointed out in the claims.

Figure 2:
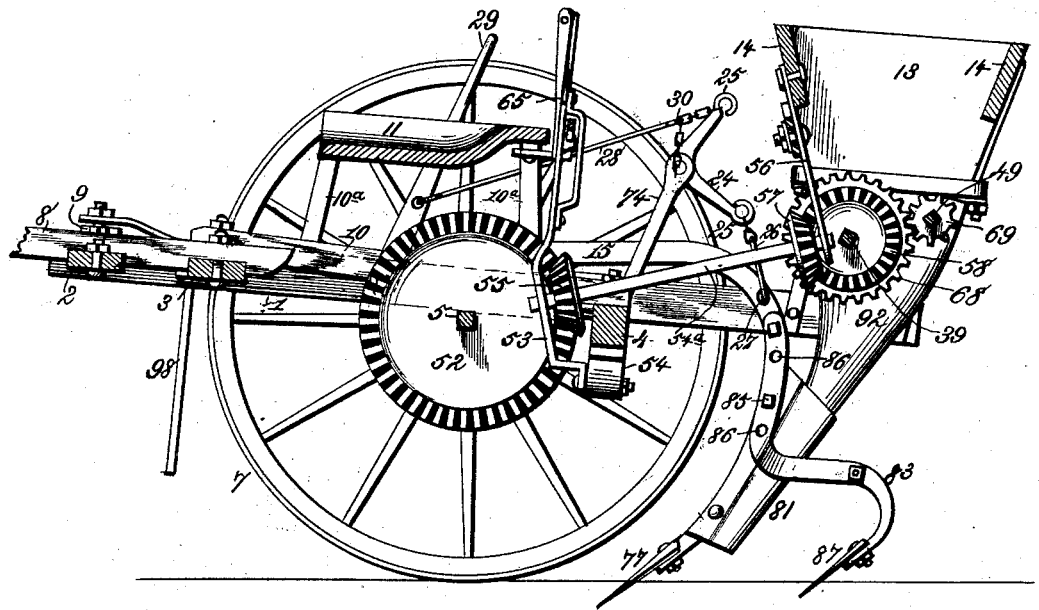
Figure 3:
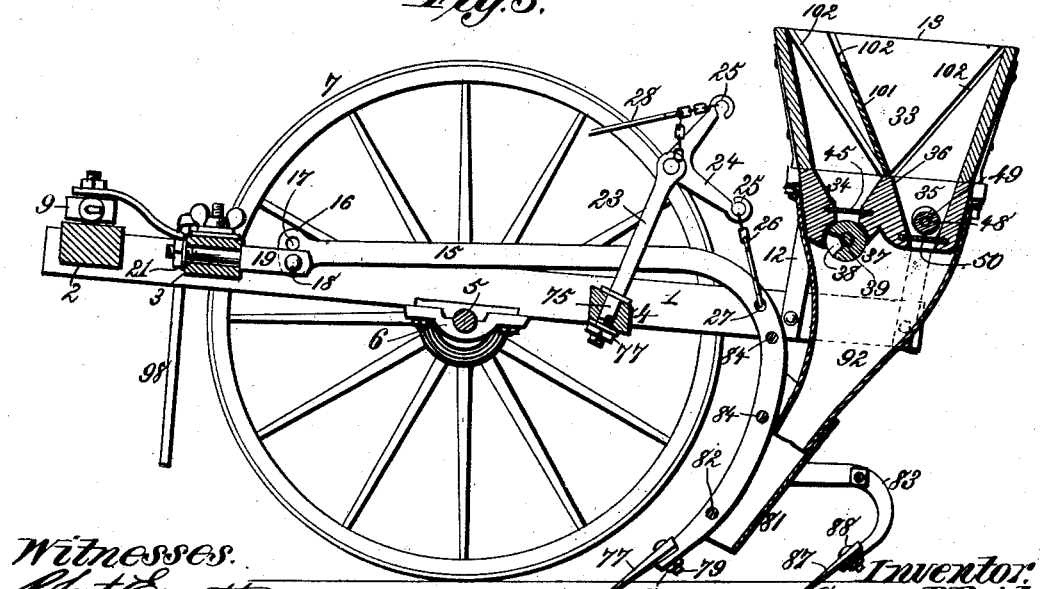

In the accompanying drawings, Figure 1 is a plan view of the machine. Fig. 2 is a vertical section from front to rear in the plane $x\ x$, Fig. 1. Fig. 3 is a similar section in the plane $y\ y$, Fig. 1. Fig. 4 is an end elevation, partly in section, of the hoppers detached. Fig. 5 is a front elevation of the hoppers. Fig. 6 is a detail perspective of one of the spring slide-gages regulating the amount of feed. Fig. 7 is a detail elevation of the gearing-lever by which the seeding and fertilizer-distributing mechanism may be connected with and disconnected from the driving-gear. Fig. 8 is a partial perspective of one of the gangs of plows employed in place of the planting and covering plows. Fig. 9 is a rear elevation of one of the seeding-plows. Fig. 10 is a side elevation of one of the land-markers shown in Figs. 1, 2, and 3.

In the said drawings the reference-numeral 1 denotes the frame of the machine, which is of rectangular form and composed of parallel side bars connected by three transverse beams, 2, 3, and 4. An axle, 5, is mounted in boxes 6 upon the side bars and supported by wheels 7, and connected to the bars 2 and 3 are the tongue 8 and whiffletrees 9.

Mounted upon the bars 3 and 4 are parallel beams 10, which support uprights $10^a$, to which is bolted the driver's seat 11. In rear of this seat, and elevated above the frame 1 by means of upright supports 12, are the hoppers 13, which extend from side to side of the frame, save for a central space, where the hoppers are connected by beams 14.

Upon both sides of the seat 11 are arranged the plow-beams 15, which extend rearward and then curve downward to form the plow-foot, as shown in Fig. 3. At their forward ends these beams are provided with a broad flat head, 16, having two openings, 17, one above the other. This is connected by a pin, 18, to a fork, 19, the latter having a shank, 20, which lies in an elongated slot, 21, in the cross-beam 3, a nut, 22, being turned upon the projecting end of the shank to hold it firmly at whatever point it is adjusted.

Upon the transverse beam 4 are mounted standards 23, upon which are fulcrumed bell-crank levers 24, having at each extremity an eye, 25. One arm of the lever is connected by a link, 26, to the plow-beam 15, which is provided with one or more openings, 27, for the attachment of the end of the link. From the other arm of the bell-crank a rod, 28, extends to a lever, 29, the rod having at one end several links, 30, which hook into the eye 25 of the bell-crank. The lever 29 is fulcrumed at its lower end upon the beam 9 and extends upward past the edge of the driver's seat 11, passing between the latter and a keeper-bar, 31, which runs parallel with the edge of the seat to which it is attached. Upon its inner edge said keeper-bar is provided with notches or teeth 32, with which the lever 29 may be engaged. By pushing the lever toward the front the driver is able to raise the plows, and by engaging the lever with one of the teeth of the keeper-bar it will retain the plows in raised position as long as may be necessary.

The construction thus described is duplicated in every respect upon the other side of the seat both as to the construction and mounting of the laterally-adjustable plow-beam and as to the lifting devices.

The bottom of each hopper is composed of a box, 33, preferably constructed of metal and having two separate compartments, 34 and 35, divided by means of a transverse partition, 36. Both compartments open toward the ground, as shown in Fig. 3, one being designed for seed and the other for a suitable fertilizing material. In the open throat of the forward compartment is formed a half round seat, in which lies a cylinder, 37, having a notch or pocket, 38, which is about parallel with the length of the opening in the bottom of the compartment. This cylinder is carried by a shaft, 39, which extends from the outer end of one hopper to the outer end of the other, the ends of the shaft being squared, except its journaled extremity, and the cylinders 37 slipped on. Said shaft has bearing in half-seats 40, Fig. 4, and its journals are held therein by plates 41, mounted on bolts 42, and receiving on their ends nuts 43, elastic washers 44 being interposed between the nuts and the plate. These washers permit a certain yield of the cylinder, whereby the crushing and breaking of the grain or seed is avoided.

A sliding gage, 45, is arranged in grooves in the box 33 just above the cylinder 37, and by drawing the same in or out the feed of the grain may be very accurately controlled. The end of this slide is provided with an elastic arm, 46, (see Fig. 6,) having its extremity bent at a right angle. This elastic arm moves in a groove in the end of the box, against which it binds, by reason of its elasticity, sufficiently to hold the slide in place.

In compartment 35 is placed a worm, 48, mounted on the end of a shaft, 49, and lying in the bottom of the box. This worm feeds the fertilizing material toward the inner end of the compartment, the open bottom of the latter being closed wholly or partially by a slide, 50, similar in construction and functions to the slide 45, already described, save that it is placed below the worm instead of above it. The journals 51 of the shaft 49 have bearing in the wall of the box 33, as shown in Fig. 4.

The shaft 39, carrying the seeding-cylinders 37, is rotated by the following means: Upon the axle 5 is mounted a main driving-gear, 52, carried by the axle, which is rigid with one of the wheels, the other wheel being left loose on the axle to permit the machine to turn without operating the gearing. Behind the driver's seat 11 is a bearing-bar, 53, having its lower end pivotally mounted in a bracket, 54, beneath the cross-beam 4. In this bearing is journaled a shaft, 54$^a$, carrying a miter-gear, 55, which meshes with the driving-gear 52. The other end of the shaft 54$^a$ is journaled in a drop-bar, 56, depending from one of the strips 14, which connect the hoppers. Upon this end of the said shaft is a second miter-gear, 57, meshing with a similar gear, 58, upon the shaft 39.

It will be seen from Fig. 5 that the drop-bar 56 is pivotally mounted at its upper end upon the strip 14. Below said strip is a plate, 59, crossing the drop-bar and having its ends firmly fastened to the walls of the hoppers. This plate has a curved slot, 60, through which passes a bolt, 61, rigidly connected to the drop-bar 56. By loosening a nut, 62, upon the bolt the drop-bar may be swung to one side to disengage the gears 57 and 58, whereupon the former may be removed from the shaft 54$^a$ and a larger or smaller gear substituted. The drop-bar 56 is then swung until the gears mesh, when the nut 62 is turned up tightly, fastening the drop-bar in position.

The bearing-bar 53 passes upward behind the driver's seat and between the latter and a curved keeper-bar, 63, having its ends bent under and fastened to said seat at its rearward angles. This bar curves upward in the line of travel of the curved bearing-bar 53, and upon its under edge are teeth or notches 64. Upon the bearing-bar beneath the keeper is pivoted a lever-pawl, 65, having a tooth, 66, which is normally thrown into engagement with the teeth of the keeper-bar by means of a spring, 67, mounted on the handle of the lever-pawl and pressing against the end of the bearing-bar. By throwing the latter in one direction or the other the miter-gear 55 may be disengaged from or meshed with the main driving-gear 52, and the seeding and fertilizer-distributing mechanism arrested or set in motion at pleasure.

Motion is communicated from the shaft 39 to the shaft 49 by means of a gear, 68, on the former meshing with a pinion, 69, on the latter. The shaft 49 is square and the pinion 69 is held in place thereon by a pin. By removing the latter the pinion may be pushed to one side and thereby disconnected from the driving-gear 68, thus rendering the fertilizer-distributing mechanism inactive without arresting the functions of the remaining parts.

The boxes 33 are constructed separately from the hoppers, and are connected thereto by straps 71, having depending threaded ends, which pass through flanges 72 upon the boxes and receive nuts 73 upon their ends, Figs. 4 and 5.

The plow-beams 15 pass through slots 74 in the standards 23, and thence curve rearward and downward to form the foot-pieces of the plows. The standards 23 are each mounted on the cross-beam 4 by means of a shank, 75, passing through a slot, 76, in said beam and receiving a nut, 77, on its end. This enables the operator to adjust each standard laterally to correspond with the position of the forks 19, to which the forward end of the plow-beams are attached.

Upon the lower end of the plow-beam is mounted the shovel or plow-point 77, consisting of a triangular plate with a sharp point, the face of the plate being slightly convex to permit the soil to pass off on both sides. The end of the plow-beam, or, as it may more properly be termed, the "plow-foot," is provided with a slot, 78, which receives a stud-bolt, 79, rigid on the plow and receiving a nut, 80, upon its rearwardly-projecting end, by which construction the plow may be adjusted upward and downward to the length of the slot 78.

Upon the plow-beam above the plow 77 is mounted the seeding-tube 81 consisting of a sheet metal chute, the edges whereof are constructed to lap upon opposite sides of the flat plow-beam, to which it is attached by rivets 82.

Upon the downwardly-curved portion of the plow-beam the covering-plows are mounted. Each of these plows is carried by a bar, 83, of substantially S shape in side elevation. These bars are bolted upon the plow-beam, and from the point of insertion of the lower bolt they curve backward and then downward, at the same time separating from each other, so as to bring the covering-plows in rear and upon both sides of the central plow. The bars 83 are bolted to the plow-beams by bolts 84 and nuts 85, and each bar is provided with two pairs of apertures, 86, Fig. 2, whereby the plows may be so attached as to operate at a higher or lower point, as circumstances may require.

The covering shovels or plows 87 are attached to the extremities of the bars 83 by studs 88 on the one passing through slots 89 upon the other, in the manner already set forth in connection with the central plow. In rear of the seed-tube 81 a rod, 90, is passed through an opening in each bar, and nuts 91 are turned upon threaded portions of said rod until they lie against both sides of the bars and thereby brace and stiffen the structure. The chief object thereof, however, is to enable the operator to adjust the distance between the covering-plows, so as to adapt the same to the size of plows employed.

A flexible chute, 92, having its upper end surrounding the box 33, and its lower end, which is of diminished size, entering the seed-tubes 81, serves to conduct the seed and fertilizing material to the ground just behind the central plow.

Instead of the seeding and covering plows shown in Fig. 9, I may use the cultivator-plows 88ª, (shown in Fig. 8,) which do not materially differ from the parts already described, save that they are arranged in substantially the same transverse line with the central plow. The cultivators are carried by arms 93, bolted to the plow-beam 15.

In order to guide the driver when the seeding mechanism is in use, land-markers are mounted upon the forward angles of the frame. Each land-marker consists of a slotted bar, 95, fastened to the frame 1 by a set screw, 96, which passes through the slot and is tapped into the bar 3. Upon the outer end of said bar are formed lugs 97, between which is pivotally mounted the end of an arm, 98, a leaf-spring, 99, being mounted on the arm 95, with its free end bearing upward against the square or angular end of the arm, 98. The latter extends outward a suitable distance and then bends at a right angle downward and extends to the ground. The use of these devices is too well known to require description.

By means of the spring 99 the land-marker is held down when extended, and the jolting of the team and frame will not throw it up and remove it from contact with the ground.

A shoulder, 100, is formed upon the arm 98 at such point that when the arm is in a horizontal position the shoulder will bear against the end of the spring and support the arm in that position.

The hoppers 13 may be divided into separate compartments by a removable partition, 101, sliding in grooves 102 in the walls of the hopper. These grooves, also, may be formed at various angles, so that the capacity of one compartment may be increased and that of the other correspondingly diminished.

I may also form two or more seed-pockets, 38, in the cylinder 37, the result being merely to increase the number of hills and correspondingly decrease the distance between them.

I prefer to incline the standards somewhat toward the rear, in order that the draft of the levers 29 upon the bell-crank levers 24 may be received by the standards in the direction of their length.

What I claim is—

1. In a seeding machine and cultivator, the combination, with the frame, of attaching-forks to which the ends of the plow-beams are pivotally attached and standards which carry the lifts of said plow-beams, both forks and standards being laterally adjustable to vary the distance between the separate gangs of plows, substantially as described.

2. The combination, with the frame having transverse beams in front and rear provided with longitudinal slots, of forks laterally adjustable in the slots of the forward beam, rearwardly-inclined vertically-slotted standards laterally adjustable in the slots of the rearward beam, and plow-beams pivoted at one end to said forks and passing through the vertical slots in the standards, substantially as described.

3. The combination, with the frame and the axle revolving with one wheel, of hoppers mounted on said frame and having their bottoms divided into two compartments, one in front and one in rear, seeding-cylinders revolving in the discharge-opening of the forward compartments and having one or more seed-pockets formed in their peripheries, worms revolving in the lower open throats of the rear compartments, and slide-gages adjustable above the seeding-cylinders and below the worms, substantially as described.

4. The combination, with the hoppers having separate seed and fertilizer compartments in their bottoms, of seeding-cylinders revolving in the one and worms revolving in the other, slide-gages adjustable above the former and below the latter, parallel shafts carrying said seeding-cylinders and worms, intermeshing gears mounted on said shaft, a shaft mounted in a swinging bearing at one end and on a pivotally-mounted bearing-bar at the other, a miter-gear on said shaft meshing with a driving-gear on the axle, and a miter-gear on the other end meshing with a similar gear on the shaft of the seeding-cylinder, substantially as described.

5. The combination, with the seeding-cylinders rotating in compartments of the hoppers, of a shaft carrying said cylinders and having its journals in seats in the walls of the seed-compartments, a plate supporting said shaft and having apertures which receive the ends of bolts depending from the seed-compartment, nuts turned upon the ends of said bolts, and elastic washers interposed between said nuts and the plate, substantially as described.

6. The combination, with the seeding-cylinders and a shaft carrying the same and having a miter-gear mounted thereon, of a pivotally-mounted bearing-plate depending from a support above, a shaft having its bearing at one end in said plate, a miter-gear thereon meshing with the gear on the seeding-shaft, and a bracing-plate crossing the bearing-plate below its point of attachment and having a slot which receives a bolt passing through the bearing-plate with a nut turned upon its end, whereby interchangeable gears may be used, substantially as described.

7. The combination, with the hoppers, the bottoms of each being divided into two compartments, of seeding-cylinders turning in the forward compartments and fertilizer feeding-worms in the rear compartments, a shaft carrying a miter-gear which meshes with a driving-miter on the axle, a bearing-bar pivotally mounted on the machine-frame and giving a bearing to the forward end of the shaft, a notched or toothed keeper-plate behind the driver's seat, and a spring-actuated lever-pawl fulcrumed on the bearing-bar and engaging with the keeper-bar, the said shaft being geared to the shaft of the seeding-cylinders, substantially as described.

8. The combination, with the hoppers divided at their bottoms into two compartments for seed and fertilizing material, respectively, of removable partitions sliding in grooves formed at various angles in the walls of the hopper, whereby the capacities of the two parts may be increased and diminished, respectively, substantially as described.

9. The combination, with the machine-frame, of a land-marker consisting of a longitudinally slotted bar connected to the frame by a set-screw passing through the slot into the frame, an angular arm having a squared end and a shoulder near the end, said arm being pivotally mounted on the end of the slotted bar, and a leaf-spring attached at one end on the slotted bar and having its free end beneath and bearing upon the squared end of the angular arm, substantially as described.

10. The combination, with the hoppers 13, of the boxes 33, divided by partitions 36, the seeding-cylinders 37, having pockets 38, the worms 48, the slide gages 45 above the seeding-cylinders, and the slide-gages 50 beneath the worms, substantially as described.

11. The combination, with the seeding-cylinders and fertilizer-feeding worms driven by shafts geared to each other, of the shaft 54$^a$, the pivotally-mounted depending plate 56, in which one end of said shaft has bearing, the cross-plate 59, having a curved slot, 60, the stud or bolt 61, and nut 62, whereby the driving-gear on said shaft may be changed as to size, substantially as described.

12. The combination, with the hoppers having the boxes 33, divided into compartments 34 and 35 by the partition 36, of the removable partitions 101, the hoppers being provided with grooves 102, of different angularity, all converging to the top of the partition 36, substantially as described.

In testimony whereof I have affixed my signature in presence of two witnesses.

G. P. REID.

Witnesses:
   A. L. RUCKER,
   F. B. LOGAN.